(12) United States Patent
McWithey

(10) Patent No.: US 9,487,124 B2
(45) Date of Patent: *Nov. 8, 2016

(54) LOCOMOTIVE HEADLIGHT ASSEMBLY

(71) Applicant: J.W. Speaker Corporation, Mequon, WI (US)

(72) Inventor: Kevin McWithey, Fond du Lac, WI (US)

(73) Assignee: J.W. Speaker, Corporation, Germantown, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/604,157

(22) Filed: Jan. 23, 2015

(65) Prior Publication Data
US 2015/0130349 A1    May 14, 2015

Related U.S. Application Data

(63) Continuation of application No. 13/596,620, filed on Aug. 28, 2012, now Pat. No. 8,946,989.

(60) Provisional application No. 61/528,580, filed on Aug. 29, 2011.

(51) Int. Cl.
| | |
|---|---|
| *H05B 37/02* | (2006.01) |
| *B60Q 1/14* | (2006.01) |
| *B61L 15/02* | (2006.01) |
| *B60Q 1/00* | (2006.01) |
| *F21S 8/10* | (2006.01) |
| *H05B 33/08* | (2006.01) |

(52) U.S. Cl.
CPC ............ *B60Q 1/1423* (2013.01); *B60Q 1/0088* (2013.01); *B61L 15/02* (2013.01); *F21S 48/1154* (2013.01); *F21S 48/1747* (2013.01); *H05B 33/0815* (2013.01); *H05B 33/0845* (2013.01); *H05B 37/02* (2013.01)

(58) Field of Classification Search
CPC .............. H05B 37/02; H05B 33/0815; H05B 33/0845; B60Q 1/1423; B60Q 1/0088; B61L 15/02; F21S 48/1154; F21S 48/1747
USPC .................... 315/82, 83, 307, 297
See application file for complete search history.

(56) References Cited

U.S. PATENT DOCUMENTS

| | | |
|---|---|---|
| 4,654,629 A | 3/1987 | Bezos et al. |
| 6,127,784 A | 10/2000 | Grossman et al. |

(Continued)

FOREIGN PATENT DOCUMENTS

DE      4242604 A1    6/1993

OTHER PUBLICATIONS

PCT International Search Report and Written Opinion, PCT/US2012/052667, Mar. 6, 2013.

*Primary Examiner* — Daniel D Chang
(74) *Attorney, Agent, or Firm* — Quarles & Brady LLP

(57) ABSTRACT

A light apparatus for use with a power source and a control switch, the control switch including an input node, an output node and at least first and second independently selectable current paths between the input and output nodes, the first selectable current path having a resistance value that is greater than the second current path, controlling light intensity as a function of which of the current path is selected, at least one light source, a controller linked to the control switch and determining the selected path and generating a control signal and a light driver linked between the output node and the light source, the driver receiving the control signal and adjusting the current applied to the light source as a function of the control signal.

23 Claims, 11 Drawing Sheets

(56) References Cited

U.S. PATENT DOCUMENTS 7,298,098 B2 * 11/2007 Wang ............................ 315/307
7,385,495 B2 * 6/2008 Buhr .................. H05B 33/0845
           340/321
8,573,807 B2 * 11/2013 Borkar et al. ........... 362/249.05

* cited by examiner

LOCOMOTIVE HEADLIGHT ASSEMBLY

CROSS-REFERENCE TO RELATED APPLICATIONS

This application is a continuation of U.S. patent application Ser. No. 13/596,620, filed Aug. 28, 2012, now U.S. Pat. No. 8,946,989 dated Feb. 3, 2015, and entitled "Locomotive Headlight Assembly," which claims priority to U.S. Provisional Patent Application Ser. No. 61/528,580 filed on Aug. 29, 2011 and entitled "Locomotive Headlight Assembly," each of which are hereby incorporated by reference.

STATEMENT REGARDING FEDERALLY SPONSORED RESEARCH OR DEVELOPMENT

Not applicable.

BACKGROUND OF THE INVENTION

The present invention relates to locomotive headlight assemblies and more particularly to a headlight assembly that includes a controller that determines which of several current paths through a resistive control switch has been selected and controls light intensity as a function of the selected current path.

A locomotive requires one or more large headlights in order to illuminate a track in front of a train for warning and safety purposes. Most locomotive headlight systems have been designed so that the headlight or headlights can be driven with different currents to generate light with two or three different intensities. For instance, when on an open track in the country, the headlights may be driven with a very high intensity to provide warning far in front of the locomotive that a train is approaching while locomotives used in a city or in a work yard may be driven at a medium or low intensity.

Most known locomotive headlight system configurations include one or more incandescent-type headlights linked to a power source through a control switch where the control switch is controllable to adjust current applied to the headlight thereby controlling headlight light intensity. For instance, in at least some cases the control switch will include three current paths between an input node linked to the source and an output node linked to the headlight. Each path has a different resistance value which affects the amount of current that passes through that path when the control switch selects the path.

Several problems exist with headlight systems like those described above. First, when a locomotive headlight fails, the headlight has to be replaced prior to using the locomotive. While replacement is typically a relatively simple process, sometimes replacement headlights may not be readily available resulting in locomotive down time (i.e., a locomotive cannot be used when a headlight malfunctions). Trains only generate revenue when they are running and therefore any down time is extremely costly.

Second, incandescent type locomotive headlights require a large amount of power and therefore are relatively costly to drive when compared to other types of headlights.

Third, electrical systems in locomotives vary appreciably and the variance affects the amount of current delivered to headlights in different locomotive setups. For instance, in many cases two or more locomotives may be linked together at the front of a train and, in many cases, any one of the linked locomotives may be used to drive and control the headlights at the front of the train. For example, where first, second and third locomotives are linked at the front of a train, each of the three locomotives will have its own power source and electrical system and any one of the locomotives may be used to drive and control the front headlights. Here, while the power sources on each of the three locomotives will have similar output, often times the outputs vary somewhat so that current delivered at any of the selectable output levels may vary somewhat. For instance, when a control switch selects the high light intensity, depending on the source output level, the high intensity currents may be different thus resulting in different headlight intensities.

Exacerbating the intensity control problem, the total resistive drop between driving source and headlight(s) depends on which power source is used to drive the headlights. For instance, in the case of three linked locomotives, where the first locomotive source is used to drive a headlight, current from the first source only has to pass through the first locomotive's electrical system. Where the second locomotive source is used to drive the headlight, current from the second source has to pass through the first and second locomotive electrical systems and the resistive drop is greater. Where the third locomotive source is used to drive the headlight, current from the third source has to pass through the first, second and third locomotive electrical systems and the resistive drop is even greater. The different resistive drops affect the output light intensities.

One solution suggested for solving the problems described above has been to provide LED based locomotive headlight assemblies. As known in the art LED headlights typically last far longer than incandescent type headlights and use less power. In addition, a controller can be provided for an LED headlight to precisely control the amount of current provided to the LEDs that comprise the headlight and therefore to control the intensity of the headlight. These controllers can be used to adjust headlight intensity to be high, medium or low.

While it would be useful to replace incandescent type headlights with LED based headlights in locomotives, one impediment to such use is that a headlight control system for switching between high, medium and lower intensities is required. Ideally the existing resistive control switch could be employed so that additional components are not required. Unfortunately, existing resistive control switches simply rely on changes in current through a switch to adjust headlight intensity. Because the current levels used for incandescent lights are far greater than currents required to drive LEDs, existing resistive control switches alone cannot be used to drive an LED headlight.

Another solution would be to install a completely different headlight control system that can deliver intensity command signals to a headlight. While this solution would work, this solution is likely cost prohibitive as it would require additional hardware and installation time.

BRIEF SUMMARY OF THE INVENTION

It has been recognized that a controller can be used to identify which of several different paths through an existing resistive control switch has been selected and can then control headlight intensity as a function of the selected path to cause the headlight to generate light at one of several different intensity levels associated with the selected path. To this end, the controller can obtain electrical operating parameters of an existing control switch in real time and use the measured electrical parameters to identify the selected control switch path. In at least some embodiments the controller may measure current and voltage values at the output node of the existing control switch and use those values to determine which switch path has been selected. In some cases the measured voltage and current values may be used to calculate a resistance drop which can then be compared to threshold resistance levels to determine which of the switch paths is selected. In some cases the threshold resistance levels can be adjusted on the fly to reflect sensed switching activities that are inconsistent with current switching states.

In at least some embodiments the controller and an LED drive circuit are mounted within a headlight housing structure where the shape and size of an external surface of the housing fits within a standard sized receiving cavity provided on a locomotive. In this case, a standard incandescent headlight can be replaced by an LED headlight via a simple swapping action without requiring any additional changes to the locomotive power electrical or control systems.

Some embodiments of the invention include a light apparatus for use with a power source and a control switch, the control switch including an input node, an output node and at least first and second independently selectable current paths between the input and output nodes, the first selectable current path having a resistance value that is greater than the second current path, the light apparatus for controlling light intensity as a function of which of the current path is selected, the apparatus comprising at least one light source, a controller linked to the control switch and determining which of the independently selectable current paths is selected and generating a control signal indicating a first light intensity and a second light intensity when the first and second current paths are selected, respectively, wherein the first light intensity is less than the second light intensity and a light driver linked between the output node and the light source, the driver receiving the control signal and adjusting the current applied to the light source as a function of the control signal.

In some cases the light source includes at least one LED. In some cases the controller determines which of the first and second current paths is selected by deriving an estimated resistance value for the selected current path. In some cases the controller assigns first and second assumed resistance values to the first and second current paths and wherein the controller determines which of the first and second current paths is selected by further comparing the estimated resistance value to first and second assumed resistance values.

In some cases the controller averages the estimated resistance value over a rolling period to generate an average resistance value, compares the estimated resistance value to the average resistance value and when the estimated resistance value is substantially greater than the average resistance value while the control signal indicates a lowest intensity, changes the assumed resistance values and, when the estimated resistance value is substantially less than the average resistance value while the control single indicates a highest intensity, changes the assumed resistance thresholds. In some cases the first and second selectable current paths are a low intensity current path and a medium intensity current path, respectively, the control switch further includes a third independently selectable current path between the input node and the output node that is a high intensity current path, the high intensity current path having a resistance that is less than the resistance of the medium intensity current path, the first and second intensity signals being a low intensity signal and a medium intensity signal, respectively, the controller generating a high intensity control signal when the high intensity current paths is selected.

In some cases the controller assigns assumed low, medium and high intensity resistance values to the low, medium and high intensity current paths, respectively, and determines which of the low, medium and high intensity current paths is selected by comparing the estimated resistance value to the assumed low, medium and high resistance values. In some cases the controller averages the estimated resistance value over a rolling period to generate an average resistance value, compares the estimated resistance value to the average resistance value and when the estimated resistance value is substantially greater than the average resistance value while the control signal indicates the low intensity, generates a low intensity control signal, sets the second assumed resistance value to the average resistance value, estimates a new average resistance value and sets the first assumed resistance value to the new average resistance value and, when the estimated resistance value is substantially less than the average resistance value while the control single indicates the high intensity, generates a high intensity control signal, sets the second assumed resistance value to the average resistance value, estimates a new average resistance value and sets the third assumed resistance value to the new average resistance value.

In some cases, (i) when the estimated resistance value is substantially greater than the average resistance value while the control signal indicates the medium intensity, the controller sets the second assumed resistance value to the average resistance value, estimates a new average resistance value and sets the first assumed resistance value to the new average resistance value, (ii) when the estimated resistance value is substantially greater than the average resistance value while the control signal indicates the high intensity, the controller sets the third assumed resistance value to the average resistance value, estimates a new average resistance value and sets the second assumed resistance value to the new average resistance value, (iii) when the estimated resistance value is substantially less than the average resistance value while the control signal indicates the medium intensity, the controller sets the second assumed resistance value to the average resistance value, estimates a new average resistance value and sets the third assumed resistance value to the new average resistance value and (iv) when the estimated resistance value is substantially less than the average resistance value while the control signal indicates the low intensity, the controller sets the first assumed resistance value to the average resistance value, estimates a new average resistance value and sets the second assumed resistance value to the new average resistance value.

In some cases the controller assigns assumed low, medium and high intensity resistance values to the low, medium and high intensity current paths, respectively, uses the assumed intensity values to identify at least a low to medium intensity threshold resistance and a medium to high intensity resistance threshold and generates the low intensity control signal when the estimated resistance value is greater than the low to medium threshold resistance, generates the medium intensity control signal when the estimated resistance value is between the low to medium intensity threshold resistance and the medium to high intensity threshold resistance and generates the high intensity control signal when the estimated resistance value is below the medium to high intensity threshold resistance. The light apparatus of claim 3 further including a current sensor for sensing current at the output node, the controller deriving the estimated resistance at least in part as function of the sensed current.

In some cases the light apparatus further includes a voltage sensor for sensing the voltage at the output node, the controller deriving the estimated resistance value at least in part as a function of the sensed voltage. In some cases the controller uses a first sensed current and a first sensed voltage sensed at a first time and a second sensed current and a second sensed voltage sensed at a second time to derive the estimated resistance value.

In some cases the driver is a pulse width modulating (PWM) driver and wherein the first time occurs when the driver is turned on to provide current to the light source and the second time occurs when the driver is turned off. In some cases the controller averages the estimated resistance over several derivations and generates the control signal as a function of the average. In some cases the control switch includes at least a third current path having a resistance that is different than the resistances of the first and second current paths, the controller determining which of the first, second and third current paths is selected and generating a control signal indicating the selected current path. Some embodiments further include a light housing wherein the controller and the driver are located in the light housing along with the light source. Some embodiments further include external surfaces designed to conform to a space provided for mounting a headlight on a locomotive.

Some embodiments are for use with a second light apparatus and further including a synchronizer that generates a sync signal for synchronizing a second light apparatus with the driver. In some cases the driver is a pulse width modulating (PWM) driver, the controller assigns first and second assumed resistance values to the first and second current paths, respectively, and determines which of the current paths is selected by measuring a first current and a first voltage at an input to the controller at a first time when the PWM driver is on to deliver current to the light source, measuring a second current and a second voltage at an input to the controller at a second time when the PWM driver is off, mathematically combining the first and second currents and the first and second voltages to calculate an estimated resistance value and then comparing the estimated resistance value and the assumed resistance values to identify one of the first and second current paths.

Other embodiments include a light apparatus for use with a power source and a control switch, the control switch including an input node, an output node and at three independently selectable current paths between the input and output nodes including high, medium and low intensity current paths, the high intensity current path having a relatively low resistance, the low intensity current path having a relatively high resistance and the medium intensity current path having a resistance between the relatively high resistance and the relatively low resistance, the light apparatus for controlling light intensity as a function of which of the current path is selected, the apparatus comprising a light housing including a base and a lens, the base forming an internal cavity open to one side, the lens covering and substantially closing the open side of the cavity, at least one light emitting diode (LED) mounted within the cavity with the LED arranged to direct light generated thereby through the lens, a controller mounted within the cavity and having an input lead that is linkable to the output node of the control switch, the controller programmed to determine which of the high intensity, medium intensity and low intensity current paths is selected and generating a control signal indicating a high, medium and low intensity when the high, medium and low intensity current paths are selected, respectively and a light driver mounted within the cavity and linked between the output node and the at least one LED, the driver receiving the control signal and adjusting the current applied to the light source as a function of the control signal.

In some cases the controller determines which of the current paths is selected by assigning at least a low to medium intensity resistance threshold and a medium to high intensity resistance threshold, sensing electrical operating parameters at the input lead, using the sensed electrical parameters to calculate an estimated resistance value for the selected current path, comparing the estimated resistance value to the low to medium and medium to high intensity resistance thresholds and, when the estimated resistance value is greater than the low to medium intensity resistance value, generating the low intensity control signal, when the estimated resistance value is less than the medium to high intensity resistance value, generating the high intensity control signal and when the estimated resistance value is between the low to medium intensity resistance value and the medium to high intensity resistance value, generating the medium intensity control signal.

Still other embodiments include a method for use with a light apparatus linked to a power source and a control switch, the control switch including an input node, an output node and at least three independently selectable current paths between the input and output nodes including high, medium and low intensity current paths, the high intensity current path having a relatively low resistance, the low intensity current path having a relatively high resistance and the medium intensity current path having a resistance between the relatively high resistance and the relatively low resistance, the method for controlling light intensity as a function of which of the current paths is selected, the method comprising the steps of providing a light emitting diode (LED) light source, sensing electrical operating parameters at the output node of the control switch, using the sensed operating parameters to determine which of the high intensity, medium intensity and low intensity current paths is selected, generating a control signal indicating a high, medium and low intensity when the high, medium and low intensity current paths are selected, respectively and adjusting the current applied to the LED light source as a function of the control signal to generate one of high, low and medium light intensity.

In some cases the step of sensing electrical operating parameters includes sensing voltage and current at the output node. In some cases the step of sensing voltage and current at the output node includes sensing a first voltage and a first current at a first time and sensing a second voltage and a second current at a second time. In some cases the step of adjusting the current applied to the LED light source includes pulse width modulating (PWM) the current by turning the current on and off and wherein the first and second times occur when the current is turned on and off, respectively.

In some cases the step of using the sensed operating parameters to determine which of the current paths is selected includes assigning at least a low to medium intensity resistance threshold and a medium to high intensity resistance threshold, using the sensed operating parameters to calculate an estimated resistance value for the selected current path, comparing the estimated resistance value to the low to medium and medium to high intensity resistance thresholds and, when the estimated resistance value is greater than the low to medium intensity resistance threshold, identifying the low intensity current path, when the estimated resistance value is less than the medium to high intensity resistance threshold, identifying the high intensity current path and when the estimated resistance value is between the low to medium intensity resistance value and the medium to high intensity resistance thresholds, identifying the medium intensity current path. Some embodiments further include the step of adjusting the low to medium intensity resistance thresholds during operation as a function of the estimated resistance value.

Yet other embodiments include a method for use with a light apparatus linked to a power source and a control switch, the control switch including an input node, an output node and at least three independently selectable current paths between the input and output nodes including high, medium and low intensity current paths, the high intensity current path having a relatively low resistance, the low intensity current path having a relatively high resistance and the medium intensity current path having a resistance between the relatively high resistance and the relatively low resistance, the light apparatus including at least one light emitting diode (LED), the method for identifying which of the current paths is selected, the method comprising the steps of setting threshold resistance values that define a high resistance range, a medium resistance range and a low resistance range, sensing electrical operating parameters at the output node of the control switch, using the sensed electrical operating parameters to calculate an estimated resistance value for the selected current path, identifying the one of the high, medium and low resistance ranges that includes the estimated resistance value, generating a low intensity control signal, a medium intensity control signal and a high intensity control signal when the estimated resistance value is in the high, medium and low resistance ranges, respectively, and controlling a current supplied to the at least one LED as a function of at least one of the low intensity control signal, the medium intensity control signal and the high intensity control signal. Some embodiments further include the step of changing the high, medium and low resistance ranges as a function of the estimated resistance value during operation.

Other embodiments include a locomotive headlight comprising a headlight housing, an LED light source mounted within the headlight housing, a controller for controlling the intensity of the LED light source, a wireless receiver linked to the controller for receiving control signals indicating a desired intensity of the light source, a positive supply line providing current to drive the light source, wherein the controller is programmed to use one of a received wireless control signal and a sensed electrical operating parameter on the positive supply line to identify a selected light intensity and to control current supplied to the LEDs as a function thereof.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
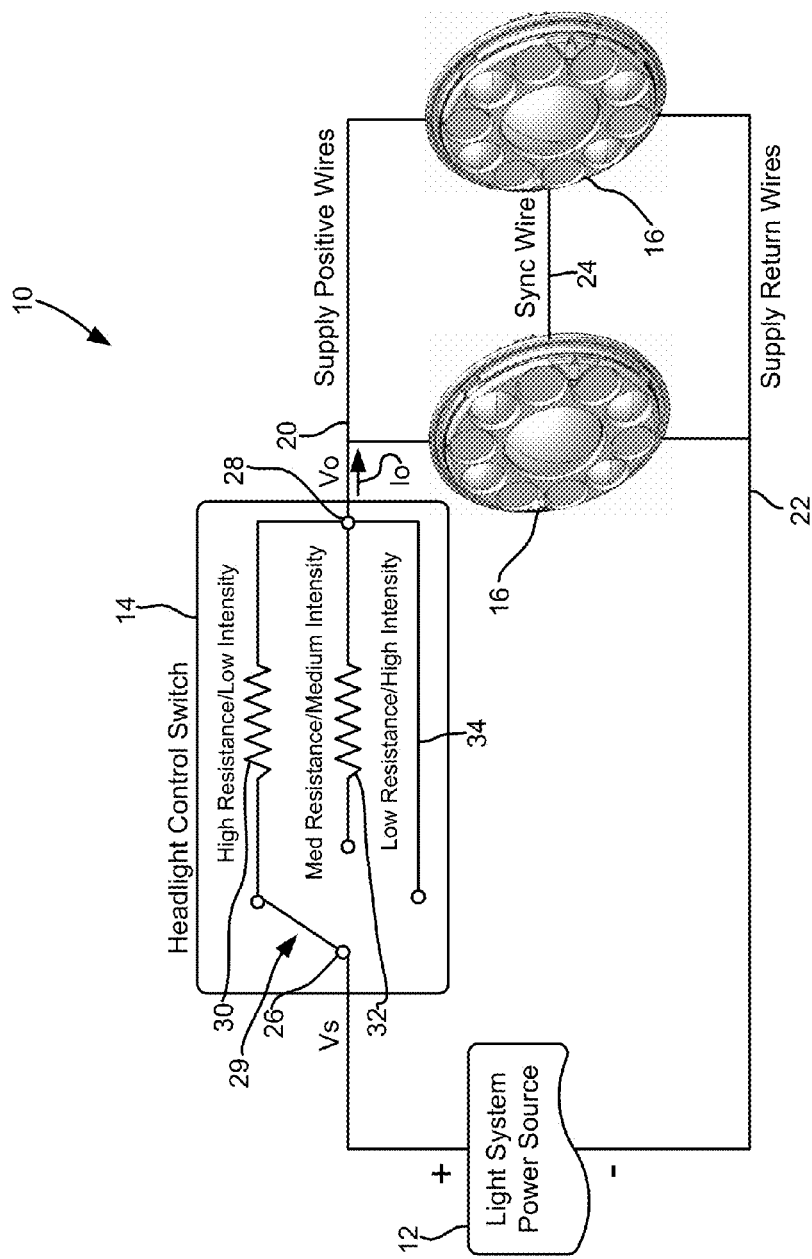
FIG. 1 is a schematic view illustrating components that comprise a locomotive headlight and control assembly that are consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers or processors.

The word "exemplary" or "example" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals corresponding to similar elements throughout the several views and, more specifically, referring to FIG. 1, the present invention will be described in the context of an exemplary locomotive headlight control system 10 including a light system power source 12, a resistive headlight control switch 14 and first and second LED-type locomotive headlight assemblies, each identified by numeral 16. Power source 12 is typically a 72 volt power source although other sources are contemplated. Source 12 is linked to headlights 16 via control switch 14.

Referring still to FIG. 1, control switch 14 includes an input node 26 and an output node 28, a single pole/three throw switch 29, a high resistance/low intensity resistive path 30, a medium resistance/medium intensity path 32, and a high resistance/high intensity path 34. The pole of switch 29 is linked to input node 26 which is in turn linked to the positive output of source 12. The three current paths 30, 32, and 34 are each linked to output node 28 and each of the paths 30, 32, and 34 is selectable via switch 29 to link input node 26 to output node 28 via any one of the three current paths 30, 32, or 34. As labeled, when the switch 29 is controlled to select path 30, the resistance between nodes 26 and 28 is high indicating that the headlights should generate low intensity light, when switch 29 selects path 32, a medium resistance is linked between nodes 26 and 28 indicating that the headlights should generate medium intensity light, and when switch 29 selects path 34, a relatively low resistance is provided between nodes 26 and 28 indicating that the headlights should generate high intensity light.

Referring yet again to FIG. 1, output node 28 is linked to each of the headlights 16 via a positive wire or cable 20. Return or negative wires or cables 22 link each of the headlights 16 to the negative terminal of power source 12. A sync wire 24 links the two headlights together.

Figure 2:
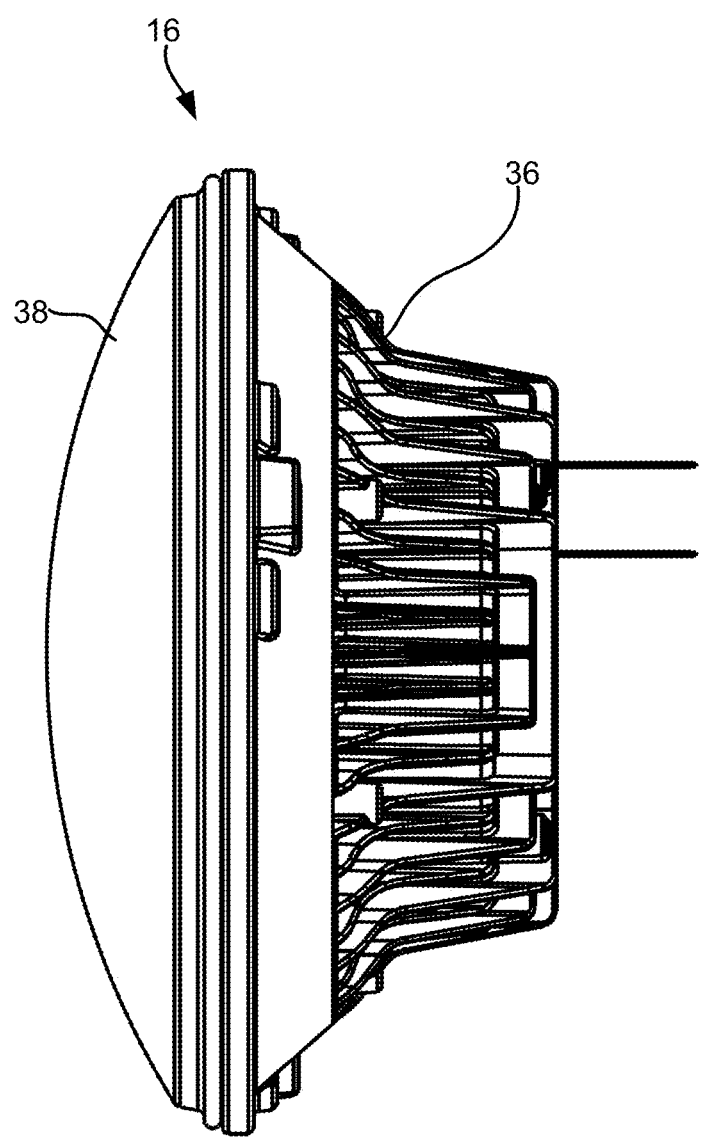
FIG. 2 is a side view of one of the headlight assemblies shown in FIG. 1.

Referring now to FIG. 2, in addition to other components, each of the headlights 16 includes a housing 36 and a lens cover 38. Housing 36 is formed of aluminum and has an external shape confined to the space occupied by a standard incandescent-type locomotive headlight. When housing 36 is formed to have a similar shape and size to a standard headlight, the headlight 16 can be easily swapped for a standard headlight in any preexisting locomotive.

Figure 3:
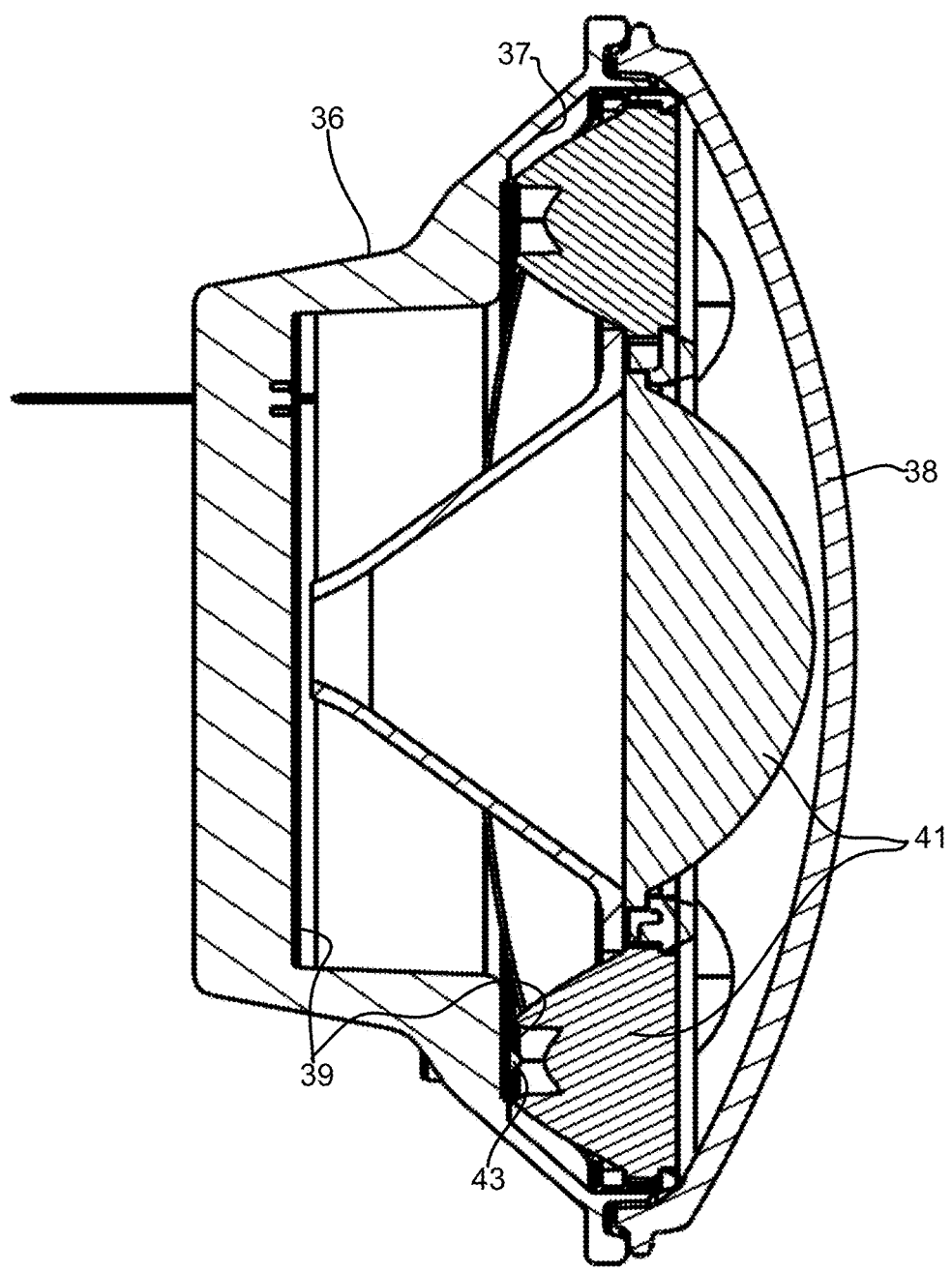
FIG. 3 is a cross-sectional view of the headlight assembly shown in FIG. 2.

Referring still to FIG. 2 and now also to FIG. 3, housing 36 forms an internal cavity 37 in which a plurality of headlight components are mounted. As shown in FIG. 3, the headlight components include, among other components, PCB boards 39 that are mounted to housing surfaces to dissipate heat into the housing 36, optics 41, and LEDs, one identified by numeral 43, which is mounted to one of the PCB boards.

Figure 4:
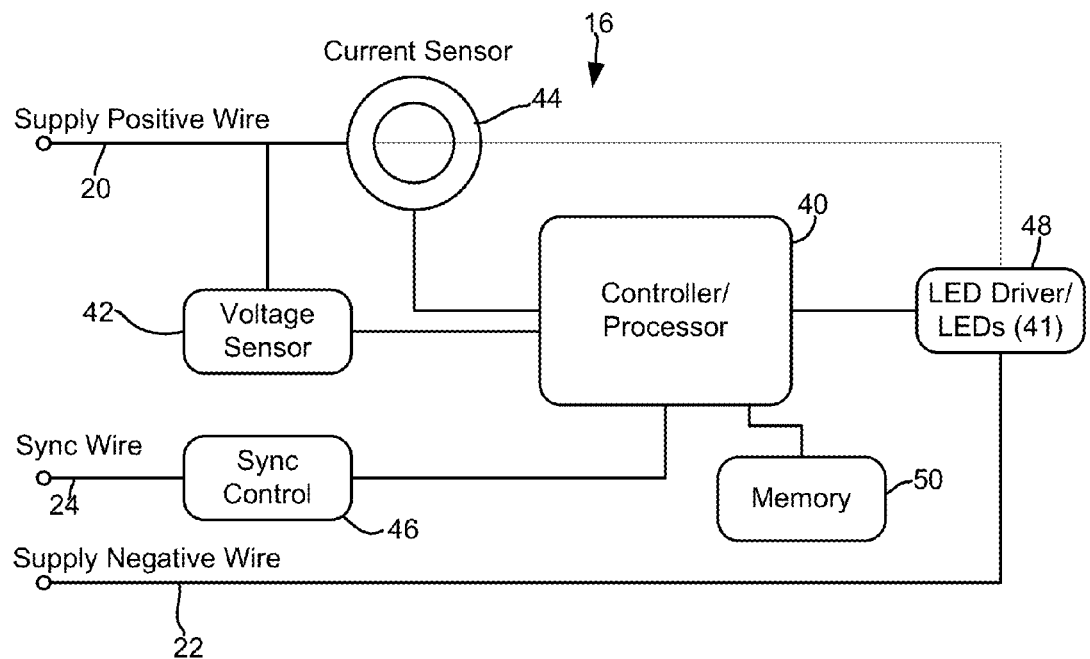
FIG. 4 is a schematic showing control components included in the headlight assembly shown in FIGS. 2 and 3.

Referring now to FIG. 4, headlight 16 includes several other components that are mounted within the housing cavity 37, including a controller/processor 40, a voltage sensor 42, a current sensor 44, a sync control 46, an LED driver 48 that is linked to the LEDs 41, and a memory 50. Several of the components shown in FIG. 4 are mounted to one or more of the PCB boards 39 shown in FIG. 3 while others may be separate from the PCB board. For instance, current sensor 44 may or may not be mounted to the PCB board. The positive and negative supply wires 20 and 22, respectively, are linked to driver 48 to provide power thereto. Current sensor 44 (e.g., a Hall effect sensor) is positioned to sense the current on positive wire 20 and provide a sensed current value to controller 40. Similarly, voltage sensor 42 is linked to positive wire 20 to sense voltage on the input line to headlight 16. As seen in FIG. 1, positive wire 20 is linked to output node 28 on switch 14 and therefore, generally, the current and voltage sensed by sensors 44 and 42 are the current and voltage at the output node of switch 14. Controller 40, in at least some embodiments, uses the sensed current and voltage values to determine which of the current paths 30, 32, or 34 (see again FIG. 1) is selected by switch 29. Controller 40, in at least some embodiments, provides a pulse width modulating (PWM) control signal to driver 48 to control the driver 48 to turn the current to the headlamp LEDs on and off in a rapid control sequence. By adjusting the duty cycle (i.e., the on-time to off-time) of the LEDs, intensity of the light generated by the LEDs can be controlled.

Figure 5:
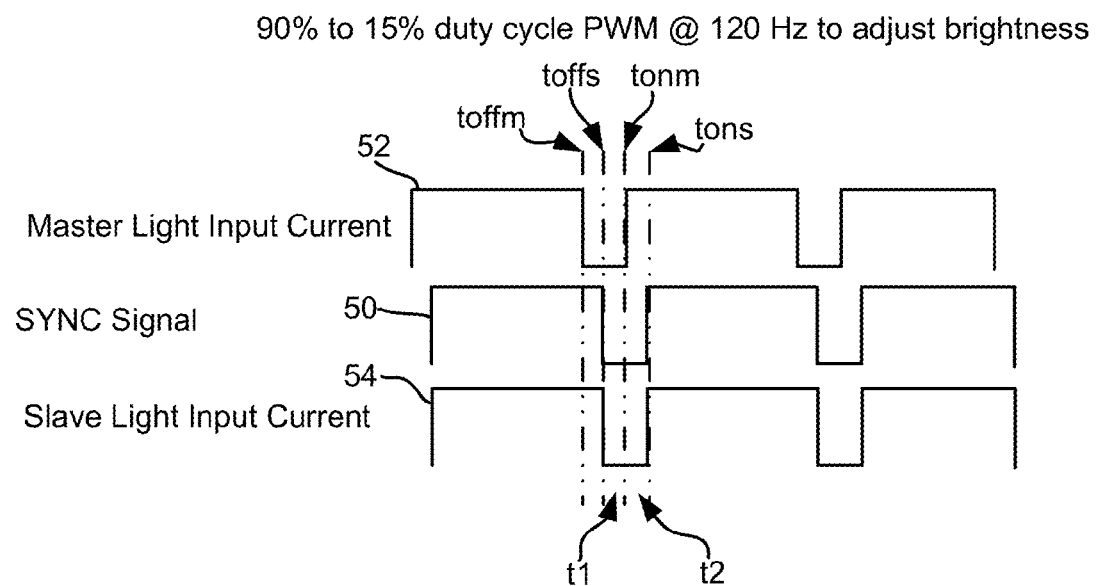
FIG. 5 is a timing diagram that is consistent with at least some aspects of the present invention.

To this end, referring now to FIG. 5, an exemplary input current 52 provided to one of the headlights 16 is illustrated. As shown, the current 52 is pulsed on and off in rapid succession where exemplary off and on times are labeled toffm and tonm, respectively. By adjusting the duration of the off times of the pulses, intensity of light generated is controlled.

Referring again to FIG. 4, sync control 46 is linked between the sync wire 24 and controller 40. Sync control 46 synchronizes control of the two headlights 16 (see again FIG. 1) so that the two headlights are driven at the same exact duty cycle and therefore generate light having identical intensities. To this end, when the headlights shown in FIG. 1 are turned on, both of the headlight controllers 40 (i.e., there is a separate controller in each one of the headlights 16) commence the process of identifying the selected control switch current path and calculating a duty cycle. One of the two controllers 40 will complete the duty cycle calculation first. When one of the controllers 40 calculates the duty cycle first, that controller 40 provides a sync signal to sync control 46 which in turn provides the sync control signal to the sync control 46 in the other of the headlights 16. When a controller 40 completes its duty cycle calculation prior to receiving a sync control signal from the other of the headlights, that controller assumes a master lamp status and uses its calculated duty cycle to control its driver 48. On the other hand, when a controller 40 receives a sync signal from the other headlight prior to completing its duty cycle calculation, that controller assumes a slave lamp status and uses the PWM sync signal received from the other headlight to control its driver 48 and LEDs 41.

Referring once again to FIGS. 1 and 4, in at least some embodiments, controller 40 stores assumed resistance values for each of the current paths 30, 32, and 34 in memory 50. In this case, to identify which of the current paths 30, 32, and 34 has been selected via switch 29, controller 40 uses the sensed voltage and current values to calculate the resistance of the selected path, compares the calculated resistance to the stored assumed resistance values, and identifies the path associated with the stored assumed resistance value that is closest to the calculated value as the selected path.

Referring once again to FIG. 1, the resistance of the path selected by switch 29 can be expressed as:

$$R = \frac{Vs - Vo}{Io} \qquad \text{Eq. 1}$$

Where Vs is the voltage provided by the source 12 at the input node 26 and Vo and Io are the voltage and current at output node 28, respectively. Empirically, it has been determined that voltage Vs changes appreciably during system operation and therefore is essentially unknown in Equation 1. For this reason, in at least some embodiments of the present invention, the output current and voltage is sensed at a first time when the LED drivers 48 (see again FIG. 4) are off so that the output voltage and current Vo and Io, respectively, have first values and at a second time when at least one of the drivers 48 passes current to LEDs so that the output current and voltage have second values that are different than the first values. In this case, Equation 1 can be written twice, one for each of the first and second times, as follows:

$$R = \frac{Vs - Vo1}{Io1} \qquad \text{Eq. 2}$$

$$R = \frac{Vs - Vo2}{Io2} \qquad \text{Eq. 3}$$

Equations 2 and 3 can be combined to yield the following equation which can be solved to calculate the control switch resistance value:

$$R = \frac{(RIo2 + Vo2 - Vo1)}{Io1} \qquad \text{Eq. 4}$$

Referring once again to FIG. 5, in at least some embodiments, the sync signal 50 between two headlights is delayed slightly so that the slave light input current is phase shifted from the master light input current a small amount. By shifting the slave light input current slightly as shown, (see period between toffs and tonm) a period occurs each switching cycle during which both the master and slave light input currents are off. In addition, each switching cycle, (see period between tonm and toffs) a period occurs during which only the master light input current is on and the slave light input current is off. In at least some embodiments, the first voltage and current values in Equation 4 are sensed at a time t1 when both of the input currents are off and the second voltage and current values are sensed at a time t2 when only the master light input current is on and the slave light input current is off.

In at least some embodiments, instead of comparing the calculated control switch resistance value to assumed high, medium, and low resistances, resistance thresholds may be set by controller 40 and stored in memory 50. In this case, after the control switch resistance value has been calculated, the calculated resistance value is compared to the resistance thresholds and the high intensity, medium intensity, or low intensity path is identified as the selected path based on the comparisons. For example, in at least some embodiments, there may be a single low to medium intensity threshold resistance value and a single medium to high intensity threshold resistance value. In this case, when the calculated resistance is higher than the low to medium intensity threshold resistance value, controller 40 determines that the low intensity path has been selected, when the calculated resistance value is lower than the medium to high intensity threshold resistance value, controller 40 determines that the high intensity path has been selected, and when the calculated resistance value is between the low to medium intensity threshold resistance value and the medium to high intensity threshold resistance value, controller 40 determines that the medium intensity path has been selected.

In at least some embodiments, controller 40 may control intensity switching between the three intensity levels such that there is at least some historesis between switching between low and medium intensities and between medium and high intensities to avoid a case where the calculated resistance value fluctuates around a single threshold value and the headlight intensity flickers back and forth between two different intensities. To this end, see exemplary FIG. 6 where four different threshold resistance values 206, 208, 210, and 212 have been set. Threshold value 206 is a medium to low intensity threshold resistance value which indicates a resistance value that must be exceeded by the calculated resistance value in order to switch from a medium intensity to a low intensity.

Similarly, threshold resistance value 208 is a resistance value below which the calculated resistance value must drop for the controller 40 to switch from low to medium intensity control. Threshold value 212 is a resistance value below which the calculated resistance value must drop in order for controller 40 to switch from medium to high intensity control, and threshold value 210 is a resistance value above which the calculated resistance value must rise for controller 40 to switch from high to medium intensity control. Thus, in FIG. 6, whenever the calculated resistance value is within the range indicated by numeral 220, the controller 40 generates control signals that cause low intensity output, when the calculated resistance value is within the range identified by numeral 222, controller 40 generates control signals that cause medium intensity output, when the calculated resistance value is in the range indicated by numeral 224, controller 40 generates control signals that cause high intensity output, when the calculated resistance value is within the range indicated by numeral 226, the controller 40 will generate control signals causing medium intensity output if the calculated resistance value was most recently within range 222 (as opposed to range 220) and will generate control signals causing low intensity output when the calculated resistance value was most recently in range 220 (as opposed to range 222), and when the calculated resistance value is in the range indicated by numeral 228, controller 40 will generate control signals causing medium intensity output if the calculated resistance value was most recently in range 222 (as opposed to range 224) and will generate control signals causing high intensity output when the calculated resistance value was most recently in the range 224 (as opposed to range 222).

Figure 6:
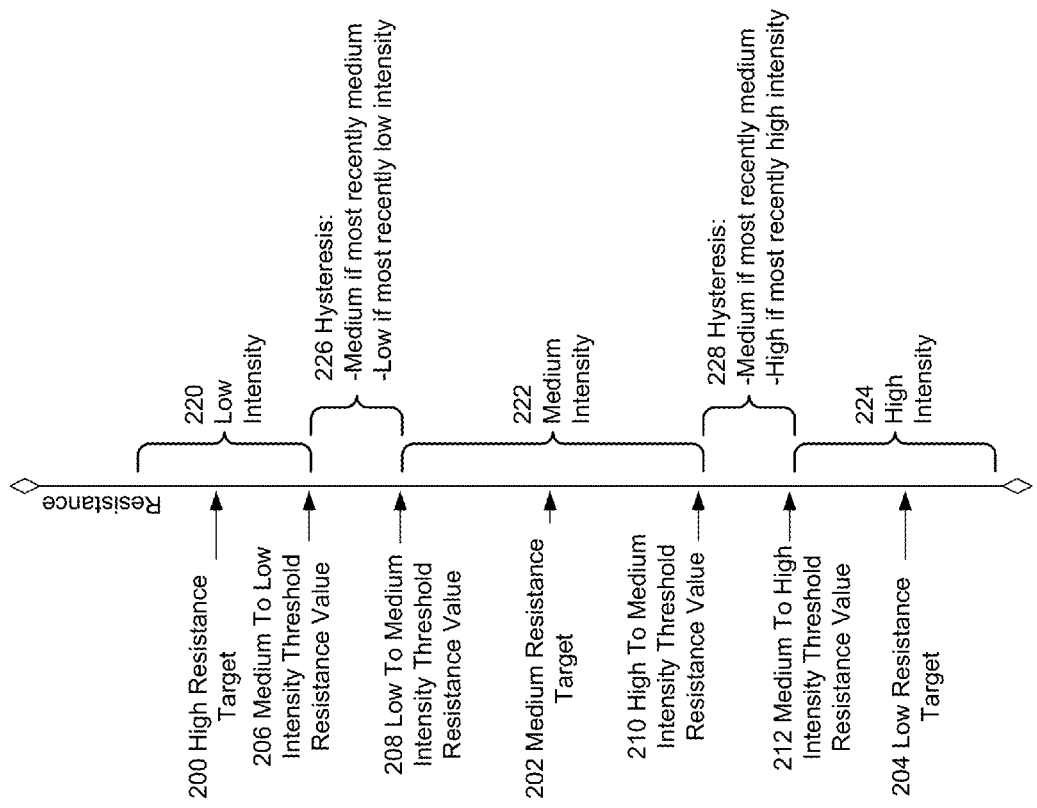
FIG. 6 is a resistance scale that shows various aspects that are consistent with the present invention.
Figure 7:
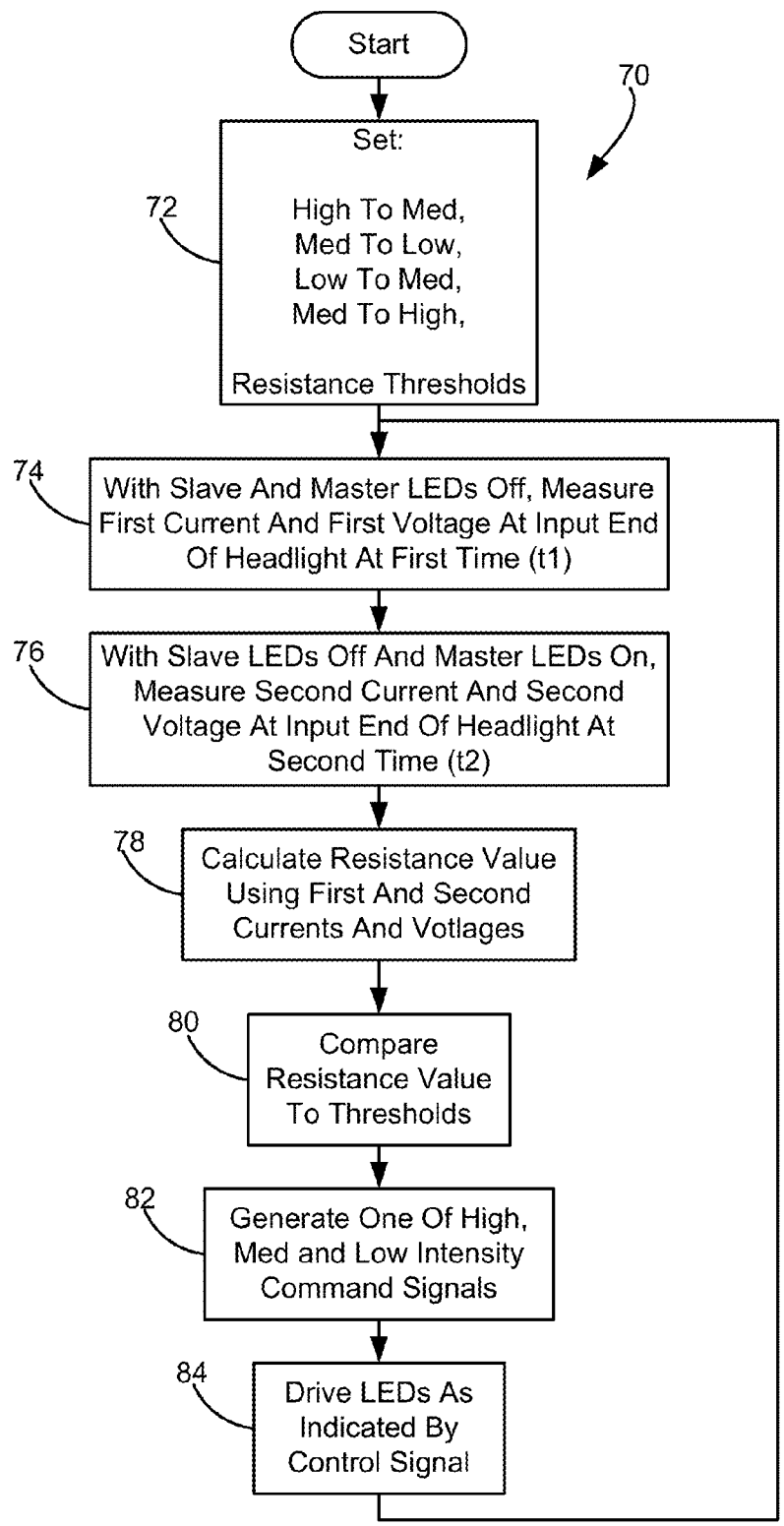
FIG. 7 is a flow chart showing method steps for controlling the assembly shown in FIGS. 1 and 4.

Referring now to FIG. 7, a method 70 consistent with the description above and that may be performed by controller 40 is shown. Referring also to FIGS. 4 and 6, at block 72, controller 40 sets the resistance threshold values. Consistent with FIG. 6, in this embodiment, controller 40 sets a high to medium threshold, a medium to low threshold, a low to medium threshold, and a medium to high threshold. At block 74, with the slave and master LEDs off (see time 1 in FIG. 5), controller 40 measures the first current Io1 and the first voltage Vo1 at the input or positive wire 20 (see again FIG. 4). At block 76, with the slave LEDs off and the master LEDs on (see time 2 in FIG. 5), controller 40 measures the second current Io2 and the second voltage Vo2 on line 20. At block 78, controller 40 solves Equation 4 above to calculate the control switch resistance value. At block 80, controller 40 compares the calculated resistance value to the threshold value set at block 72. At block 82, controller 40 generates one of high, medium, and low intensity command signals (e.g., PWM signals). At block 84, the command signals are provided to the driver 48 (see again FIG. 1) to drive the LEDs to generate the desired intensity light.

It has been recognized that different existing headlight control systems use different resistance values in the control switch 14. For this reason, setting the threshold resistance values for comparison to the calculated resistance value is complicated. According to another aspect of at least some embodiments of the present invention, controller 40 can be programmed to identify when stored threshold resistance values are inaccurate and to adjust those values essentially in real time during system operation. For example, when the calculated resistance value increases abruptly and appreciably, the increase is typically an indication that the resistive control switch has been switched from a first intensity current path to a second lower intensity current path. In this case, if the change occurs when the controller is generating control signals that cause low intensity light output, it is likely that the threshold resistance values between low and medium intensities should be reduced. Similarly, when there is an appreciable and abrupt increase in calculated resistance value while the controller is generating control signals that cause high intensity output light. It is likely that the threshold resistance values between the medium and high intensity settings should be increased.

Referring again to FIG. 6, to adjust threshold resistance values, in at least some embodiments, the controller 40 is programmed to recalculate a high resistance target value 200, a medium resistance target value 202, and a low resistance target value 204, and then to use those target values to set the threshold resistance values.

Figure 8:
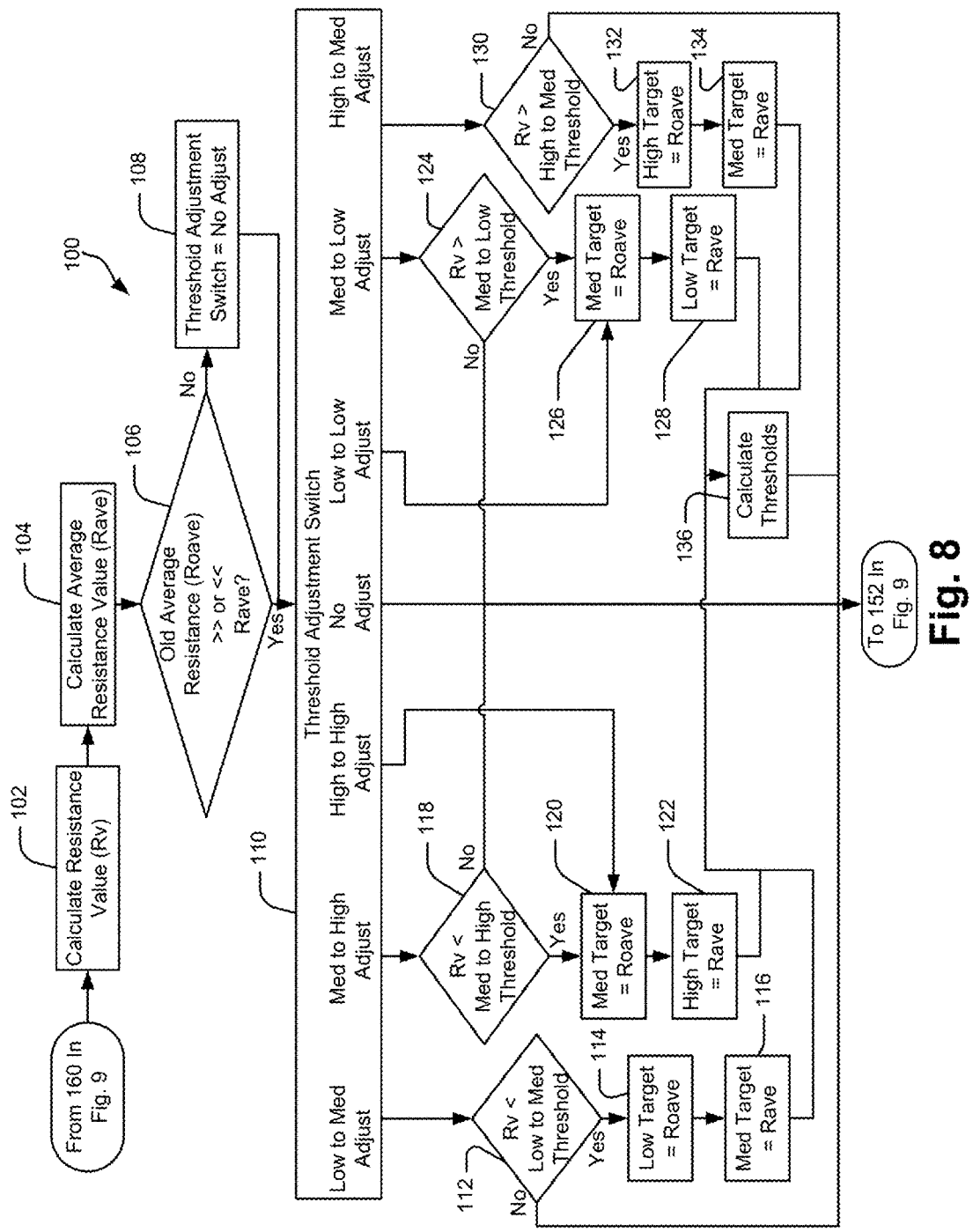
FIG. 8 is another flow chart showing a portion of a method that is consistent with at least some aspects of the present invention.

Referring now to FIG. 8, a process 100 for scrutinizing threshold resistance values and adjusting those resistance values as a function of changing calculated resistance values as illustrated. Initially, it is assumed that threshold resistance values (see again FIG. 6) are set. Here, the initial threshold resistance values may be preset to values that are typical within the industry or may initially be set to threshold resistance values most recently set when the lighting system 10 was most recently turned on. Starting at block 102, the controller 40 calculates the control switch resistance value Rv. At block 104, controller 40 calculates an average Rave of the calculated resistance values over some time period (e.g., 50 PWM cycles). At decision block 106, controller 40 compares an old average resistance value Roave to the average resistance value Rave. Initially, when the system is first turned on, there is no old average resistance value, and therefore, control passes to block 108 where a threshold adjustment switch control signal is set to "no adjust". After block 108, control passes down to a threshold adjustment switch block 110.

Threshold adjustment switch 110 includes seven different outputs indicating different light intensity adjustment states. The seven light intensity adjustment states include a "low to medium adjustment" state, a "medium to high adjustment" state, a "high to high adjustment" state, a "no adjust" state, a "low to low adjustment" state, a medium to low adjustment" state, and a "high to medium adjustment" state. The states are selected by the sub-process shown in FIG. 9 and described below. In general, the low to medium adjustment state occurs when a current intensity is low when the calculated resistance value increases appreciably and abruptly, the medium to high adjustment states occurs when the current intensity is medium and the calculated resistance value increases appreciably and abruptly, the high to high adjustment state occurs when the current intensity is high and the calculated resistance value increases substantially and abruptly, the no adjustment state occurs when the calculated resistance value does not change abruptly and appreciably irrespective of the current intensity, the low to low adjustment state occurs when the calculated resistance value decreases appreciably and abruptly while the current intensity is low, the medium to low adjustment state occurs when the current intensity is medium and the calculated resistance value decreases appreciably and abruptly, and the high to medium a adjustment state occurs when the current intensity is high and the calculated resistance value decreases appreciably and abruptly. Initially, because the threshold adjustment switch was set to no adjust at block 108, the first time through adjustment switch 110 after the light system has been turned on, control passes to block 152 in FIG. 7 and the threshold values are not modified.

Figure 9:
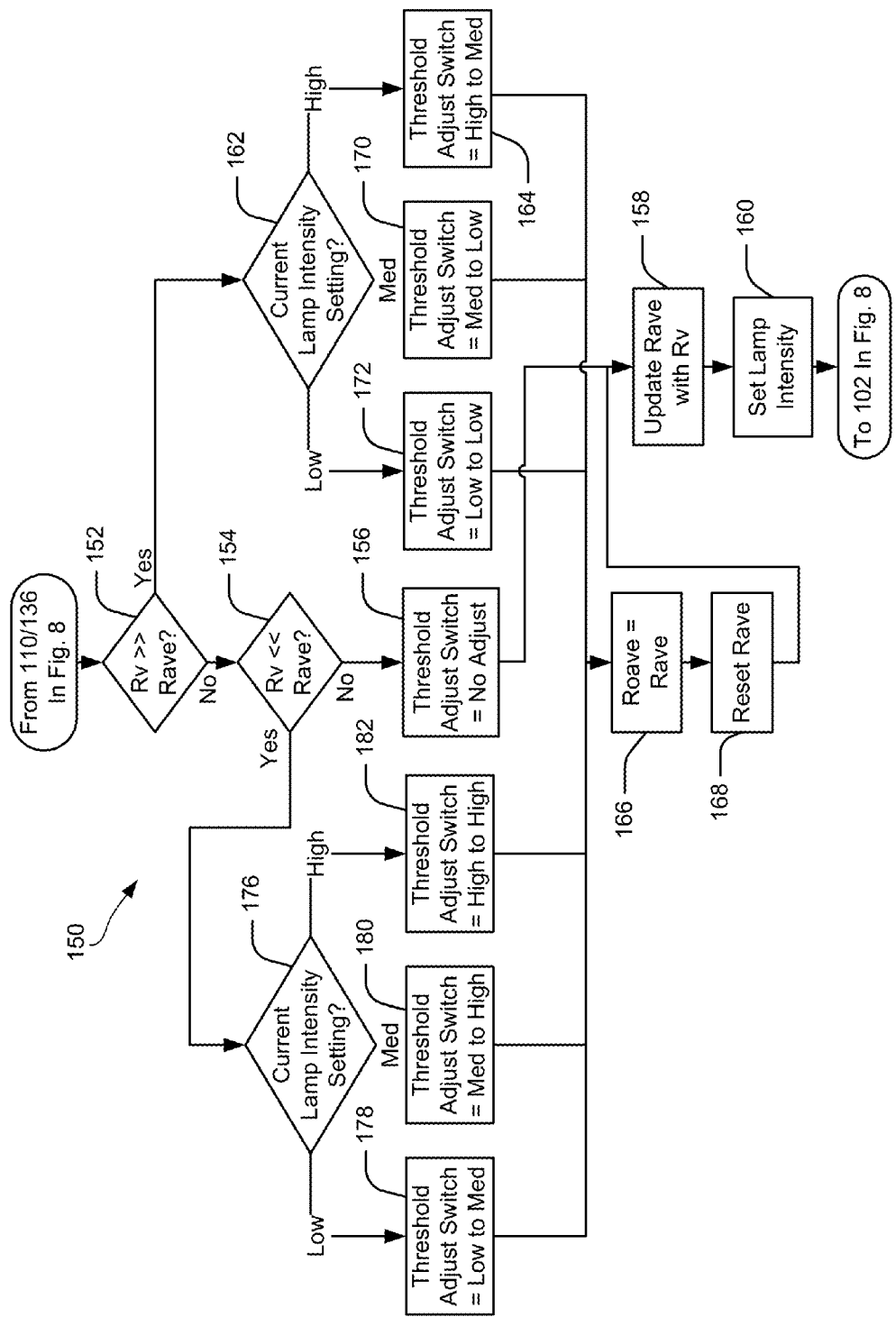
FIG. 9 is a continuation of the flow chart shown in FIG. 8.

Referring now to FIG. 9, at blocks 152 and 154, controller 40 compares the most recent calculated resistance value Rv to the average resistance value Rave. Where the calculated resistance value Rv is much greater than the average resistance value Rave, control passes to block 162. Where the calculated resistance value Rv is much less than the average resistance value Rave, control passes to block 176. Where the calculated resistance value Rv is not much great or much less than the average resistance value Rave, control passes to block 156. At block 156, the threshold adjustment switch state is said equal to "no adjust" after which control passes down to block 158. At block 158, controller 40 updates the average resistance value Rave with the most recently calculated resistance value Rv. At block 160, light intensity is set as described above in FIG. 7.

Referring still to FIG. 9, when the calculated resistance value Rv is much greater than the average resistance value Rave so that control passes to block 162, at block 162, controller 40 identifies the current lamp intensity setting (e.g., high, medium, or low). Where the current lamp intensity setting is low, control passes to block 172. Where the threshold adjust switch state is set to "low to low". After block 172, control passes to block 166 where the old average resistance value Roave is set equal to the current average resistance value Rave. Next, at block 168, the current average resistance value Rave is reset after which control passes to block 158 and then to block 160 where lamp intensity is again set.

Referring still to FIG. 9, where the current lamp intensity setting at block 162 is medium, control passes down to block 170 where the threshold adjust switch state is set equal to "medium to low". After block 170, control passes down through blocks 166 through 160 and those steps are performed as indicated above. At block 162, where the current lamp intensity setting is high, control passes to block 164 where the threshold adjust switch state is set to "high to medium". Again, after block 164, control passes down through blocks 166, 168, 158, and 160, where those steps are performed as described above.

Referring still to FIG. 9, when the calculated resistance value Rv is much less than the current average resistance value Rave so that control passes to block 176, at block 176, controller 40 identifies the current lamp intensity setting. Where the current lamp intensity setting is low at block 176, control passes down to block 178 where the threshold adjust switch state is set equal to "low to medium". After block 178, control passes down through blocks 166, 168, 158, and 160 where those steps are performed as described above. At block 176, where the current lamp intensity setting is at medium, control passes to block 180 where the threshold adjust switch state is set equal to "medium to high". After block 180, control passes through blocks 166, 168, 158, and 160, where those steps are performed as described above. At block 176, where the current lamp intensity setting is high, control passes to block 182 where the threshold adjust switch state is set equal to "high to high", after which control passes through blocks 166, 168, 158, and 160 where those steps are performed as described above. After block 160, control passes back up to block 102 as in FIG. 6.

Thus, it should be appreciated that after each pass through the sub-process 50 shown in FIG. 9, the threshold adjust switch state will be set to reflect an instantaneous switching condition of the control switch 14 shown in FIG. 1.

Referring again to FIG. 8, and more specifically to threshold adjustment switch 110, controller 40 control passes to one of blocks 112, 118, 120, 126, 124, or 130, depending upon the currently set threshold adjustment switch state. Again, where the switch state is set to "no adjust", control passes back down to block 152 in FIG. 7 where the process described above continues to loop. When the switch state is set to "low to medium", meaning that the current intensity is set to low when the calculated resistance value decreases abruptly and appreciably (see again blocks 154, 176, and 178 in FIG. 9), control passes to block 112 where the calculated resistance value Rv is compared to the low to medium threshold resistance value (see 208 in FIG. 6). Where the calculated resistance value Rv is less than the low to medium threshold resistance value, control passes to block 114 where the low resistance target (see 204 in FIG. 6) is set equal to the old average Roave. At block 116, the medium resistance target (see 202 in FIG. 6), is set equal to the current average resistance value Rave. After block 116, control passes to block 136 where the thresholds (see again FIG. 6) are recalculated using the low and medium resistance targets that were set at blocks 114 and 116. After block 136, control passes to block 152 in FIG. 7 where the process described above continues. Where the threshold adjustment switch state is set to "medium to high" indicating that the calculated resistance value Rv was much less than the average resistance value Rave when the light intensity was set to high, control passes to block 118 where the calculated resistance value Rv is compared to the medium to high threshold value (see 212 in FIG. 6). Where the calculated resistance value Rv is less than the medium to high threshold value, control passes to block 120 where the medium resistance target (see 220, 202 in FIG. 6) is set equal to the old average resistance value Roave. Next, at block 122, the high resistance target value is set equal to the current average resistance value Rave. After block 122, control passes to block 136 where the medium and high resistance target values set at blocks 120 and 122 are used to recalculate and adjust the threshold values. After block 136, control passes down to block 152 in FIG. 7.

Referring still to FIG. 8, where the adjustment switch state is set to "high to high", indicating that the current lamp intensity setting is high and that the calculated resistance value Rv is much less than the average resistance value Rave, control passes to block 120 where the medium resistance target value set equal to the old average resistance valve Roave. Next, at block 122, the high resistance target value is set equal to the current average resistance value Rave and then control passes to block 136 where thresholds are recalculated.

Referring yet again to FIG. 8, where the adjustment switch state is set to "high to medium", indicating that the calculated resistance value Rv is much greater than the average resistance value Rave when the current lamp intensity setting was high, control passes to block 130 where controller 40 compares the calculated resistance value Rv to the high to medium threshold value (see 210 in FIG. 6). Where the calculated resistance value Rv is greater than the high to medium threshold, control passes to block 132 where the high resistance target is set equal to the old average resistance value Roave. Next, at block 134, the medium resistance target value is set equal to the average resistance Rave after which control passes to block 136 where the thresholds are recalculated. At block 130, where the calculated resistance value Rv is less than the high to medium threshold value, control passes down to block 152 in FIG. 7 so that the thresholds are not recalculated.

Referring again to FIG. 8 where the adjustment switch state is set to "medium to low", indicating that the current lamp intensity setting is medium and that the calculated resistance value Rv is much greater than the average resistance value Rave, control passes to block 124. At block 124, controller 40 compares the calculated resistance value Rv to the medium to low threshold value (see 208 in FIG. 6). Where calculated value Rv is greater than the medium to low threshold value, control passes to block 126 where the medium resistance target is set equal to the old average resistance Roave. Next, at block 128, the low resistance target is set equal to the current average Rave after which control passes to block 136 where thresholds are recalculated using the medium and low resistance target value set at blocks 126 and 128. Where the calculated resistance value Rv is less than the medium to low threshold at block 124, control passes to block 152 in FIG. 7 so that the thresholds are not recalculated.

Referring yet again to FIG. 8, where the adjustment switch state is set equal to "low to low", indicating that the calculated resistance value Rv is much greater than the average resistance value Rave and that the current lamp intensity setting is set equal to low, control passes to block 126. At block 126, the medium resistance target is set equal to the old average resistance value Roave. At block 128, the low resistance target is set equal to the current average resistance value Rave after which control passes to block 136. At block 136, the thresholds are recalculated using the medium resistance target value and the low resistance target value set at blocks 126 and 128. After block 136, control passes to block 152 in FIG. 7.

It has also been recognized that in some cases where a new locomotive including an LED type headlight is linked to one or more old locomotives, the new locomotive may not be equipped with a resistive control switch as that type of switch would not have been necessary for controlling an LED headlight (i.e., new locomotives with LED lighting initially installed presumably will not require the clunky resistive type control switches needed to control incandescent headlights). Instead, a new locomotive with LED headlights likely will have some other way to indicate the three levels of light intensity to the headlights. In at least some cases it is contemplated that a new locomotive will include a controller that is capable of generating digital control signals that can be transmitted via a simple conductor to a headlight where the headlight will include a controller to receive the control signals and control the LED brightness accordingly.

Where a new locomotive is linked to one or more old locomotives, communication between a new locomotive control system and a headlight in an old locomotive is somewhat complicated. In at least some embodiments it is contemplated that any light intensity control signal from a new locomotive may be transferred to an old locomotive via a control line that is passed through one of the selectable paths through the control switch on the old locomotive. For instance, as seen in FIG. 1 the exemplary low intensity path has minimal resistance and a digital or other control signal from a new locomotive could be transmitted via the low resistance current path. In this case, the controller 40 could be programmed to, in addition to operating as indicated above, monitor for a digital or other control signal received at output node 28 and, when a control signal is received at node 28, could use that signal for control purposes instead of attempting to identify which of the current paths in switch 14 has been selected. Here, either a digital signal or the calculated path may take preference.

Figure 10:
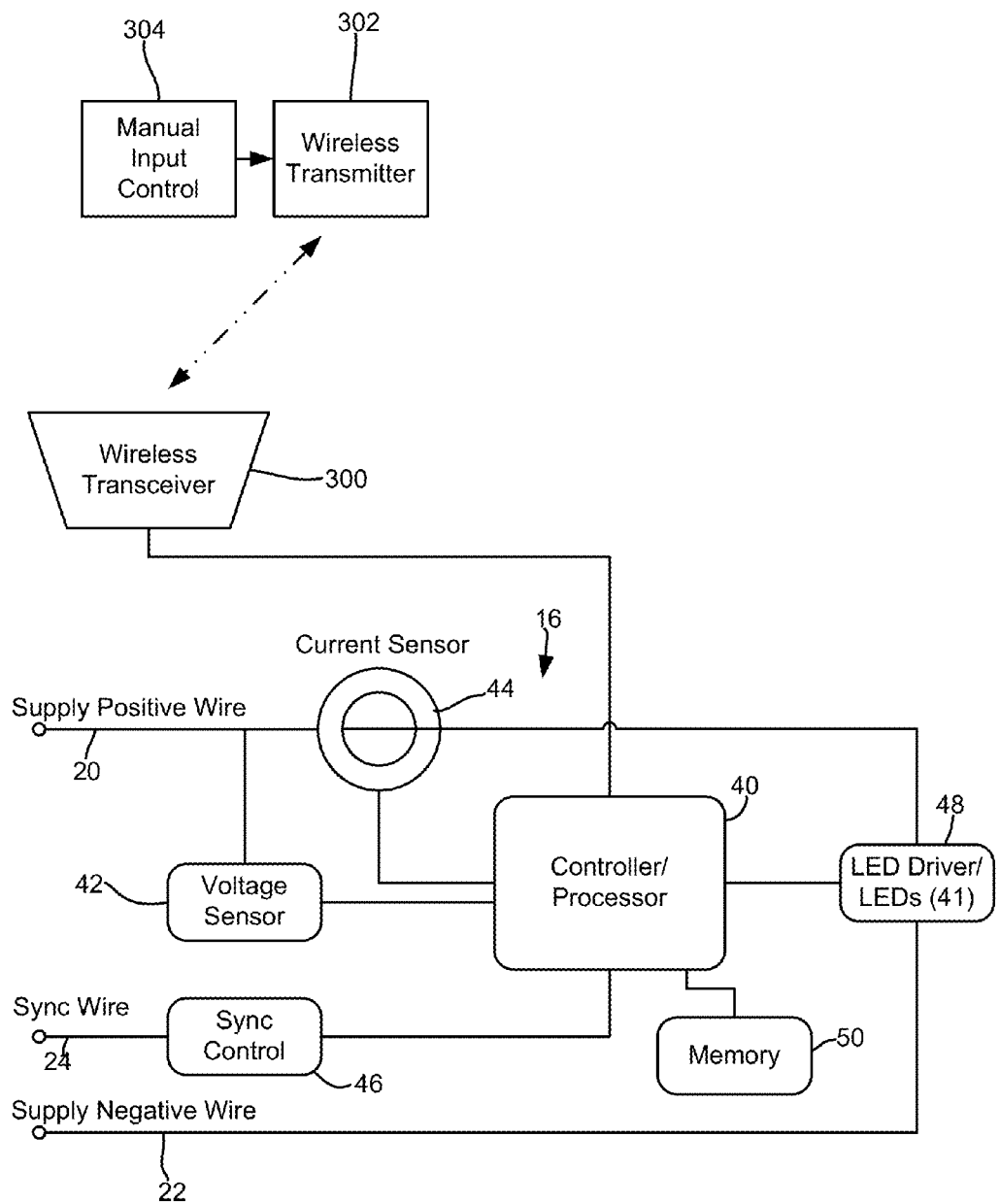
FIG. 10 is a schematic diagram similar to the diagram shown in FIG. 4, albeit including a wireless sub-system.

In still other embodiments it is contemplated that new locomotives may be equipped to communicate with their own headlights and/or headlights of linked old locomotives via wireless communication. In this case there may be no resistive control path to sense. Here, in at least some applications, it is contemplated that a wireless transceiver 300 may be mounted to a PCB board inside the headlight housing 36 and may be linked to the controller as shown in FIG. 10. In this case, a wireless transmitter (or transceiver) 302 on a new locomotive will be linked to a manual input control (e.g., a three position selection switch). Control 304 generates a high, medium or low signal based on its current position and transmitter 302 transmits the signal to transceiver 300 which in turn provides the signal to controller 40.

In some cases the controller 40 may be programmed to either use a received wireless control signal to control a headlight or to derive a control signal by calculating the resistive current path through a control switch in the manner described above. In at least some cases controller 40 will be programmed to use one of a received wireless signal or sensor information as a primary control source. For instance, in some cases controller 40 will be programmed to use sensed signals from sensors 42 and 44 first to identify a currently selected path through a control switch and will only use a wireless control signal if sensors 42 and 44 do not sense any signals. In the alternative, a wireless control signal may take precedence over any sensed information on line 20.

One advantage to having a controller that communicates wirelessly with headlights is that the controller can communicate with either its own headlight or headlights in other linked locomotives.

Figure 11:
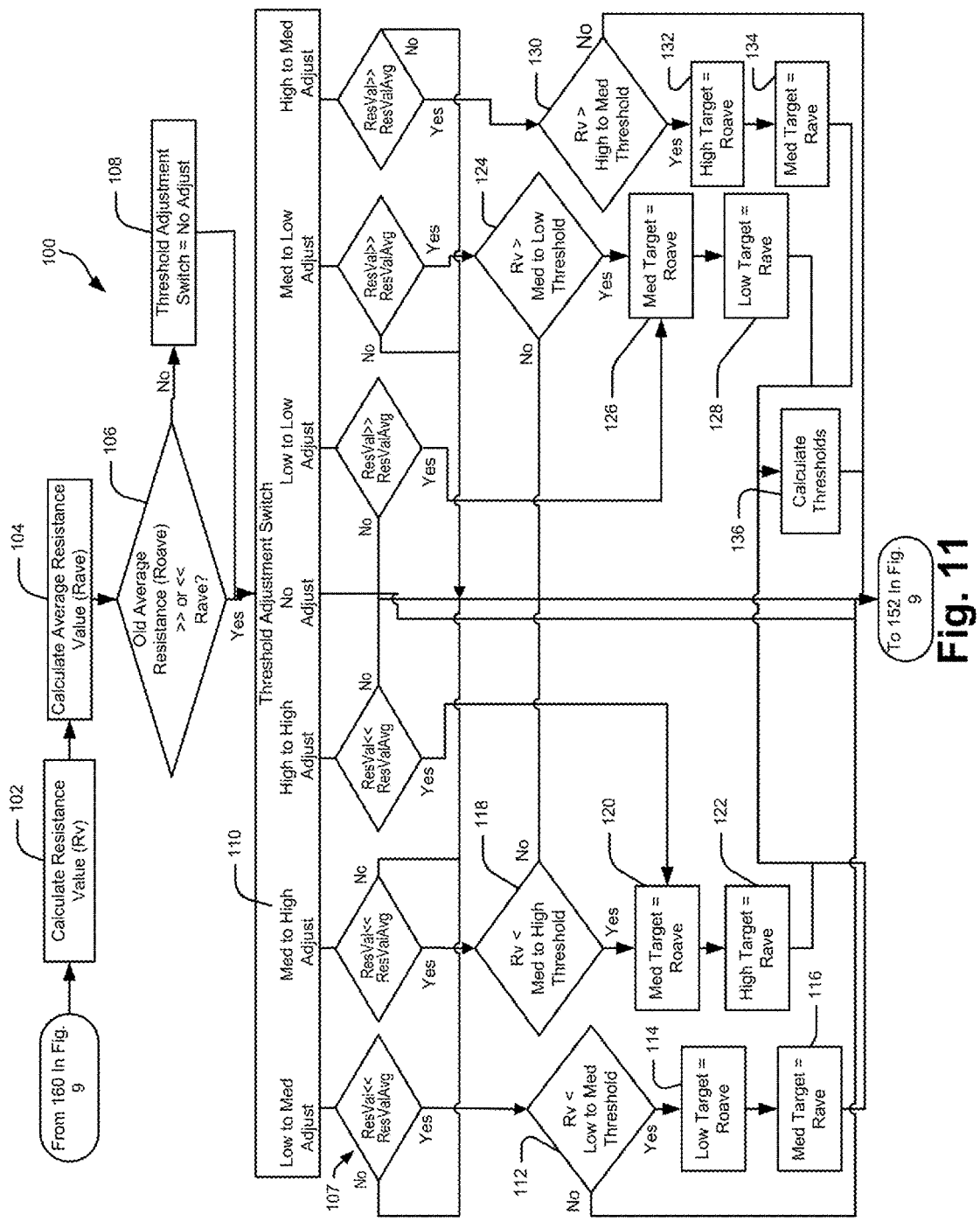
FIG. 11 is a flowchart showing a portion of a method that is similar to the method shown in FIG. 8 and that is consistent with other embodiment of the present invention.

FIG. 11 shows another flow chart that is similar to the portion of the flowchart shown in FIG. 8, albeit where some of the steps have been placed by other steps. In general, in FIG. 11, block 106 from FIG. 8 has been eliminated and replaced by the additional six decision blocks 107 that follow the threshold adjustment switch 110 checking if the calculated resistance value is much greater or much less than the current resistance value average. Blocks in FIG. 11 labeled with numerals that mirror the numbers in FIG. 8 perform the functions described above with respect to FIG. 8.

Referring once again to FIG. 4, while the system components including the sensors, sync control 40, memory 50 and driver 48 are shown and described as being located within the headlight housing, in some embodiments all or a portion of those components may be located outside the housing in a separate module. Here, the controller would operate in the same fashion described above to identify the selected control switch current path and a link would be provided to the headlight for controlling as a function of the path selected.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Where a headlight is equipped with a wireless receiver, any wireless transmitter may be authorized to control the headlight to automatically change headlight intensity. To this end, a satellite may be able to control headlight intensity as a function of a locomotive mounted GPS transmitter so that headlights are automatically set to high, medium or low intensities as a function of location during travel. In other cases a terminal controller may be used to remotely control headlight intensity wirelessly. In other cases a headlight may be automatically remotely controlled where a resistive control switch onboard the locomotive is usable to bypass the automatic control and allow manual control.

Thus, the invention is to cover all modifications, equivalents, and alternatives falling within the spirit and scope of the invention as defined by the following appended claims.

To apprise the public of the scope of this invention, the following claims are made.

What is claimed is:
1. A locomotive headlight comprising:
a light housing including a base and a lens, the base forming an internal cavity, with the lens covering and substantially closing the internal cavity;
at least one light emitting diode (LED) mounted within the cavity, with the LED arranged to direct light generated thereby through the lens;
a controller having an input lead that is coupled to a control switch, the control switch including an input node, an output node and at least two independently selectable current paths between the input node and the output node including high intensity and low intensity current paths, the input lead being coupled to the output node of the control switch, the controller to determine which of the high intensity and low intensity current paths is selected by deriving an estimated resistance value for the selected current path;
a voltage sensor to sense the voltage at the output node, the controller to derive the estimated resistance value at least in part as a function of the sensed voltage;
a current sensor to sense current at the output node, the controller to derive the estimated resistance value at least in part as a function of the sensed current;
the controller programmed to generate a control signal indicating a high intensity and low intensity when the high intensity and low intensity current paths are selected, respectively; and a light driver coupled between the output node and the at least one LED, the light driver to receive the control signal and to adjust a current applied to the at least one LED as a function of the control signal.

2. The locomotive headlight of claim 1, further including a wireless receiver linked to the controller to receive a control signal to indicate a desired intensity of the light source, and a positive supply line to provide the current to drive the at least one LED.

3. The locomotive headlight of claim 2, wherein the controller is programmed to use one of a received wireless control signal and a sensed electrical operating parameter on the positive supply line to identify a selected light intensity and to control current supplied to the at least one LEDs as a function thereof.

4. The locomotive headlight of claim 1, where in the high intensity current path has a relatively low resistance and the low intensity current path has a relatively high resistance.

5. The locomotive headlight of claim 1, wherein the controller is mounted within the cavity.

6. The locomotive headlight of claim 1, wherein the light driver is mounted within the cavity.

7. The locomotive headlight of claim 1, further including at least three independently selectable current paths between the input node and the output node including high intensity, medium intensity and low intensity current paths.

8. The locomotive headlight of claim 1, wherein controller uses a first sensed current and a first sensed voltage sensed at a first time and a second sensed current and a second sensed voltage sensed at a second time to derive the estimated resistance value.

9. The locomotive headlight of claim 8, wherein the light driver is a pulse width modulating (PWM) driver and wherein the first time occurs when the light driver is turned on to provide current to the at least one LED and the second time occurs when the light driver is turned off.

10. A lighting system comprising:
a control switch, the control switch including an input node, an output node and at least first and second independently selectable current paths between the input node and the output node, the first selectable current path having a resistance value that is greater than the second selectable current path, the control switch for controlling light intensity as a function of which of the current paths is selected;
a first light apparatus; the first light apparatus including a first light source;
a first controller linked to the control switch, the first controller to determine which of the independently selectable current paths is selected and to generate a control signal indicating a first light intensity and a second light intensity when the first current path and the second current path is selected, respectively, wherein the first light intensity is less than the second light intensity;
a first light driver linked between the output node and the first light source, the first light driver to receive the control signal and to adjust the current applied to the first light source as a function of the control signal;
a second light apparatus, the second light apparatus including a second light source;
a second controller linked to the control switch, the second controller to determine which of the independently selectable current paths is selected and to generate a control signal indicating a first light intensity and a second light intensity when the first current path and the second current path is selected, respectively, wherein the first light intensity is less than the second light intensity; and
a second light driver linked between the output node and the second light source, the second light driver to receive the control signal and to adjust the current applied to the second light source as a function of the control signal.

11. The lighting system of claim 10, further including a first synchronizer to generate a sync signal for synchronizing the second light apparatus with the first light driver.

12. The lighting system of claim 10, further including a second synchronizer to generate a sync signal for synchronizing the first light apparatus with the second light driver.

13. The lighting system of claim 11, wherein the first synchronizer is linked between a sync wire and the first controller.

14. The lighting system of claim 12, wherein the second synchronizer is linked between a sync wire and the second controller.

15. The lighting system of claim 11, wherein the sync wire links the first light apparatus and the second light apparatus together.

16. A headlight apparatus having controllable defined light intensities, the headlight apparatus to be controlled with a control switch, the control switch including an input node, an output node and independently selectable electrical paths between the input and output nodes, the headlight apparatus for controlling light intensity as a function of which of the independently selectable electrical paths is selected, the headlight apparatus comprising:
at least one light source;
a controller in communication with the control switch, the controller to determine which of the independently selectable electrical paths is selected and to generate a control signal indicating a defined light intensity; and
a light driver linked between the output node and the at least one light source, the light driver to receive the control signal and to adjust a current applied to the at least one light source as a function of the control signal.

17. The headlight apparatus of claim 16, wherein the at least one light source is at least one LED.

18. The headlight apparatus of claim 16, wherein the controller is in wireless communication with the control switch.

19. The headlight apparatus of claim 16, wherein the controller determines which of the independently selectable electrical paths is selected by deriving an estimated electrically measurable value for the selected path.

20. The headlight apparatus of claim 19, wherein the controller averages the estimated electrically measurable value over several derivations and generates the control signal as a function of the average.

21. The headlight apparatus of claim 16, further including a headlight housing, wherein the controller and the light driver are located in the headlight housing along with the at least one light source.

22. The headlight apparatus of claim 21, wherein the headlight housing includes external surfaces designed to conform to a space provided for mounting the headlight apparatus on a locomotive.

23. The headlight apparatus of claim 16, further including a synchronizer to generate a sync signal to synchronize a second headlight apparatus with the light driver.

* * * * *